UNITED STATES PATENT OFFICE.

ALEXANDER SCHANSCHIEFF, OF LONDON, ENGLAND.

PROCESS OF MANUFACTURING ACTIVE COMPOSITIONS FOR SECONDARY AND PRIMARY BATTERY ELEMENTS.

SPECIFICATION forming part of Letters Patent No. 621,150, dated March 14, 1899.

Application filed January 3, 1898. Serial No. 665,470. (No specimens.)

*To all whom it may concern:*

Be it known that I, ALEXANDER SCHANSCHIEFF, a subject of the Queen of Great Britain and Ireland, residing at London, England, have invented a certain new and useful Process for the Manufacture of Active Compositions for Secondary and Primary Battery Elements; and I do hereby declare the following to be a full, clear, and exact description of the invention, such as will enable others skilled in the art to which it appertains to make and use the same.

The active-material composition used for secondary batteries on the Faure principle consists of a minium mixture for the positive and a litharge mixture for the negative plate, mutually reacting on the sulfuric acid.

The active-material composition made in the usual manner is not quite penetrated by the exciting liquid, so that the electric current has to pass through a resisting dry material before the conductor or grid can be reached, and when the current is strong the dry material becomes heated and expands, thus causing a dropping away of the material from the parts of the grid. In order to avoid this evil, various improved methods have already been tried, which, however, have not as yet produced a materially better result as regards efficiency. By the present new mode of making plates a very considerably higher efficiency is attained. This mode consists, essentially, in mixing in definite proportions finely-powdered carbon, such as charcoal, with suitable organic acids, such as formic acid and tartaric acid, and then adding sulfuric acid of 1.825, whereby great heat is produced, and when the mixture has cooled down I add the oxid of lead, minium, or litharge. When cold, I make it into a dough-like paste, with sulfuric-acid solution in the proportion of ten per cent. of the acid. Again, great heat is produced as the liquid brings the said ingredients into intimate contact. The paste after having cooled down is put onto the grid-shaped or other conductor. Said conductor may be of any desired shape or construction, such as are now used in storage-cells, and when dried by exposure to the air for twenty-four hours the "plates" are placed in the cell and I insert them in the electric circuit and add the liquid—the sulfuric-acid solution. Under the influence of the electric current which is passed through the plates to be "formed" the hydrogen passes to the "positive" plates, and this being *in statu nascendi* unites with the oxid of lead, (PbO,) the metallic lead being left behind in a porous condition, and the oxygen passes to the "negative" plate and oxidizes the $Pb_3O_4$, the peroxid of lead and carbon being left behind in a highly porous condition in the place where the organic acid was, so that the pores of the mass become filled with a highly porous substance, which is very highly gas absorbent and conductive. The result of this method is evidenced from a comparison of the total capacity of the cells for a certain weight and for a given output.

I have found that an accumulator constructed in accordance with my invention has a very high efficiency.

A suitable proportion of parts in the paste is the following for one kilogram: minium or litharge, seven hundred and thirty grams; tartaric acid, twenty grams; formic acid, ten grams; wood-charcoal or other pure carbon, seventy grams; sulfuric acid, one hundred and seventy grams; total, one thousand grams.

The negative plates for primary elements may also be produced in the manner described.

I claim—

A process for the production of active-material compound for battery elements consisting in intimately mixing finely-powdered carbon with formic acid, tartaric acid and sulfuric acid, when the mixture has cooled adding the active material and when cooled making the mixture into a dough-like paste, with sulfuric-acid solution, whereby the paste after it has dried and been "formed" is in a highly-porous condition and has its pores filled with highly-porous gas absorbent and conductive matter.

In testimony that I claim the foregoing as my invention I have signed my name in presence of two subscribing witnesses.

ALEXANDER SCHANSCHIEFF.

Witnesses:
 FRED C. HARRIS,
 V. JENSEN.